United States Patent [19]

Welty

[11] Patent Number: 5,109,222

[45] Date of Patent: Apr. 28, 1992

[54] REMOTE CONTROL SYSTEM FOR CONTROL OF ELECTRICALLY OPERABLE EQUIPMENT IN PEOPLE OCCUPIABLE STRUCTURES

[76] Inventor: John Welty, 3753 S. Barrington #3, Los Angeles, Calif. 90066

[21] Appl. No.: 329,352

[22] Filed: Mar. 27, 1989

[51] Int. Cl.$^5$ .................... H04B 1/00; H04B 10/00
[52] U.S. Cl. ........................ 340/825.72; 455/352; 359/142; 359/174
[58] Field of Search ............ 340/825.07, 825.22, 340/825.24, 825.62, 825.69, 825.71, 825.72, 310 A, 310 R, 310 CP; 455/89, 600, 603, 151, 352, 353, 601; 379/102; 307/117; 358/194.1, 335; 341/23

[56] References Cited

U.S. PATENT DOCUMENTS

| | | | |
|---|---|---|---|
| 4,200,862 | 4/1980 | Cambell et al. | 340/310 A |
| 4,596,049 | 6/1989 | Rizzotti, III | 340/825.72 |
| 4,703,359 | 10/1987 | Rumbolt et al. | 358/194.1 |
| 4,755,883 | 7/1988 | Uehira | 455/600 |
| 4,825,200 | 4/1989 | Evans et al. | 358/194.1 |
| 4,841,368 | 6/1989 | Rumbolt et al. | 455/603 |
| 4,843,386 | 6/1989 | Wolf | 340/825.72 |
| 4,856,081 | 8/1989 | Smith | 358/194.1 |
| 4,866,434 | 9/1989 | Keenan | 340/825.69 |
| 4,885,803 | 12/1989 | Hermann et al. | 340/825.72 |

Primary Examiner—Donald J. Yusko
Assistant Examiner—Dervis Magistre
Attorney, Agent, or Firm—Robert J. Schaar

[57] ABSTRACT

A remote control system capable of controlling electrically operable equipment in a person occupiable structure and which has an essentially unlimited command format. The system comprises a signal receiving sensor such as an infrared sensor, and which can receive a signal from a remote control unit, typically a hand-held remote control unit. The infrared signal is processed to be compatible with electrically operable equipment as for example, sound entertainment system, electrical appliances or the like. A central computer or microprocessor is associated with the dwelling structure and receives a signal from the remote control unit, via the signal receiving sensor, and which computer generates a control signal for control and operation of the electrically operable equipment. The remote control system has an input means to receive the code format of each type of electrically operable equipment to thereby generate a format of encoded signals for each type of electrically operable equipment. These encoded signals are compatible with and capable of operating the electrically operable equipment. Signals may be sent from the electrically operable equipment through the computer to the remote control unit for providing feedback information to the user of the remote control unit.

11 Claims, 5 Drawing Sheets

REMOTE CONTROL SYSTEM FOR CONTROL OF ELECTRICALLY OPERABLE EQUIPMENT IN PEOPLE OCCUPIABLE STRUCTURES

BACKGROUND OF THE INVENTION

1. Field of the Invention

This invention relates in general to certain new and useful improvements in remote control systems for controlling electrically operable equipment in occupyable structures, and more particularly, to remote control equipment of the type stated with an essentially unlimited command format such that the system is responsive to a large number of pieces of electrically equipment having different command formats and which system can generate encoded signals compatible with any and all of such electrically operable equipment.

2. Briief Description of the Prior Art

In recent years, many pieces of electrically operable equipment in dwelling structures, such as houses and the like, are capable of automatic control. For example, many home entertainment systems contain intelligent monitors which are capable of causing energization or de-energization of the entertainment systems at selected time intervals. Most popularly known is the so-called "VCR" unit which can be pre-set to cperate at a certain time and to automatically record a certain program for a selected time frame and then automatically de-energize itself.

In addition to the foregoing, there are other forms of automated electrically operable equipment. Thus, for example, a heating unit can be set to operate at certain times or temperatures and end at certain times or temperatures or to operate under other pre-set conditions. There have also been a large number of organizations which have introduced various other types of electrically operable equipment which can be operated by intelligent controllers. Indeed, there are many proposals to have a fully automated home in which all of the electrically operable equipment will contain some intelligent member, such that the equipment may be operated automatically.

One of the major problems confronting the designer of a dwelling environment, such as a house, with automated electrically operable equipment, is the simple fact that there is no standard language or command format which is capable of operating each piece of electrically operable equipment. As a simple example, a home entertainment system may operate with a command format substantially different than the command format for another type of equipment, such as a heating unit. Thus, each piece of electrically operable equipment must be operated with its own command format. Moreover, each piece of equipment used only one format which had to be entered by a computer terminal making it difficult to add, change and operate all equipment at will.

There have also been proposals to provide a so-called "smart house" in which various lighting systems, security systems and the like are controlled by a central monitor. However, each piece of equipment must be produced so that it can be operated by a single command format under this proposal.

The concept of a so-called "smart house" was also described in Smart House Electrical Systems publication dated September, 1988. However, while this bulletin describes the use of a central system controller, each of the pieces of electrically operable equipment were connected by electrical current carrying conductors from a central processor to the electrically operable equipment. Moreover, each piece of equipment was operated by the same command format. Thus, one could not add or change pieces of electrically operable equipment at will and merely update a command format in the central processor.

The concept of a home automation standard has been reported in Electronic House Journal, January-February, 1989 edition. In this Journal edition, there was a proposal for using various types of home controlled devices, such as TV controllers and with different controllers having a capability of handling more than a single appliance. However, as pointed out in this Journal edition, this was a major problem inasmuch as each of the pieces of electrically operable equipment were produced by different sources having different command format operations. More specifically, this Journal emphasized the fact that "there was no standard or specification upon which these 'compatible' devices might be based". Thus, while this Journal suggests the desirability of some standard, none has been accepted.

Heretofore, there has not been any system capable of operating electrically operable equipment with a universally unlimited number of command formats in a single environment such as a dwelling structure.

OBJECTS OF THE INVENTION

It is, therefore, one of the primary objects of the present invention to provide a remote control system for operating electrically operable equipment in person occupyable structures and which has an unlimited command format for generating various types of encoded signals for operating each of the different types of electrically operable equipment.

It is another object of the present invention to provide a remote control system of the type stated which is capable of automatically controlling various types of electrically operable equipment in different rooms of a dwelling structure.

It is a further object of the present invention to provide a remote control system of the type stated which is highly effective for use in a home environment and for control of a wide variety of electrically operable equipment normally found in home environments.

It is an additional object of the present invention to provide a remote control system of the type stated which relies upon the use of a microprocessor or computer for generating control signals selective to each type of electrically operable equipment and whereby different encoded signals can operate each of the different types of electrically operable equipment.

It is another salient object of the present invention to provide a method of controlling electrically operable equipment in a dwelling structure from a remote control unit and where each of the types or pieces of electrically operable equipment may operate with different command format signals.

It is still another object of the present invention to provide a remote control system of the type stated which is highly effective in operation and which can be constructed and installed at a relatively low cost.

With the above and other objects in view, my invention resides in the novel features of form, construction, arrangement and combination of parts presently described and pointed out in the claims.

BRIEF SUMMARY OF THE INVENTION

A remote control system capable of operating electrically operable equipment in a person occupyable structure with essentially unlimited command format. In the most preferred embodiment, the person occupyable structure is a dwelling structure, such as a house. Even moreso, the remote control system of the present invention finds highly effective use in dwelling structures of this type which have a plurality of rooms, such that electrically operable equipment in one room can be controlled by a remote controlled hand-held unit in another room of the dwelling structure.

The remote control system of the present invention is primarily adapted to enable control of electrically operable equipment of the type normally found in houses as for example, home entertainment systems, environmental control systems such as heating and cooling systems, home appliances such as food making equipment and the like. In this case, each of these pieces of equipment, if adapted for automatic control, are usually operated by a command format peculiar to the manufacturer of that equipment. Moreover, since there is no standard for command formats, each manufacturer of electrically operable equipment typically has its own unique command format. Thus, a command format capable of operating one piece of equipment typically is not capable of operating another piece of electrically operable equipment adapted for automatic control.

The present invention relies upon a signal receiving sensor in each room of the person occupyable structure. In this respect, the term "room" is used in a broad sense to refer to one location or zone in a person occupyable structure which may be separated from another area by means of a partition or even a partial partition, such that there are at least two or more distinct areas.

The signal receiving sensor is preferably one which does not require current carrying conductors, such as electrical cables. Thus, the sensor may be, for example, an infrared sensor. However, it should be understood that the term "sensor" is used in a broad aspect to encompass devices which are connected by current carring conducters. Thus, for example, the sensor could adopt the form of a handset of a conventional telephone receiver. In this way, existing signal conveyance systems may be employed.

The remote control system of the present invention also utilizes a central computer means, which may be in the form of a microcomputer or other microprocessor. This computer means is connected to the sensor in each room of the person occupiable structure by conductors and is adapted to receive control signals from a remote control unit. In this way, the conductors enable the sensors to transmit signals to the computer means for controlling the electrically operable equipment. In like manner, the sensors in each room can receive information bearing signals from each of the pieces of electrically operable equipment. The computer means thereupon causes information to be generated to the one or more remote control units.

In a preferred embodiment of the present invention, each remote control unit is a hand-held remote control unit and is provided with a plurality of manually actuable switches. These switches can be actuated in pre-determined combinations in order to generate a particular type of command signal.

The remote control unit preferably includes a display and typically a visible display, such that information can be generated on the screen of the display. This display is capable of providing information transmitted from each of the pieces of electrically operable equipment so that the user knows the status of each of these pieces of electrically operable equipment.

The remote control unit also includes some intelligent member, and particularly a microprocessor, capable of generating a menu type display. As a simple example, the user of the remote control hand-held unit can actuate one or more switches for control of home lighting. The display will then generate a menu of a particular lighting device such as (1) overhead light, (2) closet light, (3) lamp, etc., requesting the user to select a particular type. When the user then actuates a plurality of switches in pre-determined combinations, another display may be established in the menu format which requests the user to introduce the command requesting the type of action desired. In this way, the single hand-held unit is capable of enabling operation of an almost unlimited number of pieces of electrically operable equipment.

The computer means has an input means to receive and hold the code format of each piece of electrically operable equipment which is operated in the system. In this way, the computer means can generate a format of encoded signals for each type of electrically operable equipment and which encoded signals are compatible with and capable of operating that piece of electrically operable equipment. Accordingly, certain pieces of the electrically operable equipment will be operated by different encoded signals than other pieces of electrically operable equipment. Accordingly, the invention is highly unique in that there is essentially an unlimited number of code formats which may be formed into encoded signals by the computer for operating different pieces of electrically operable equipment.

In essence, the remote control unit has a specified number of input key switches e.g. eighty pushbutton key switches. The invention uses a protocol to provide an essentially unlimited command format. The user can literally program the unit using these eighty keys to generate a menu and the possible decision making choices which are available.

This invention possesses many other advantages and has other purposes which may be made more clearly apparent from a consideration of the forms in which it may be embodied. These forms are shown in the drawings and are more fully described in the detailed description. However, it is to be understood that such detailed description is only set forth for purposes of illustrating and describing th principles of the invention and is not to be taken in a limiting sense.

BRIEF DESCRIPTION OF THE DRAWINGS

Figure 1:
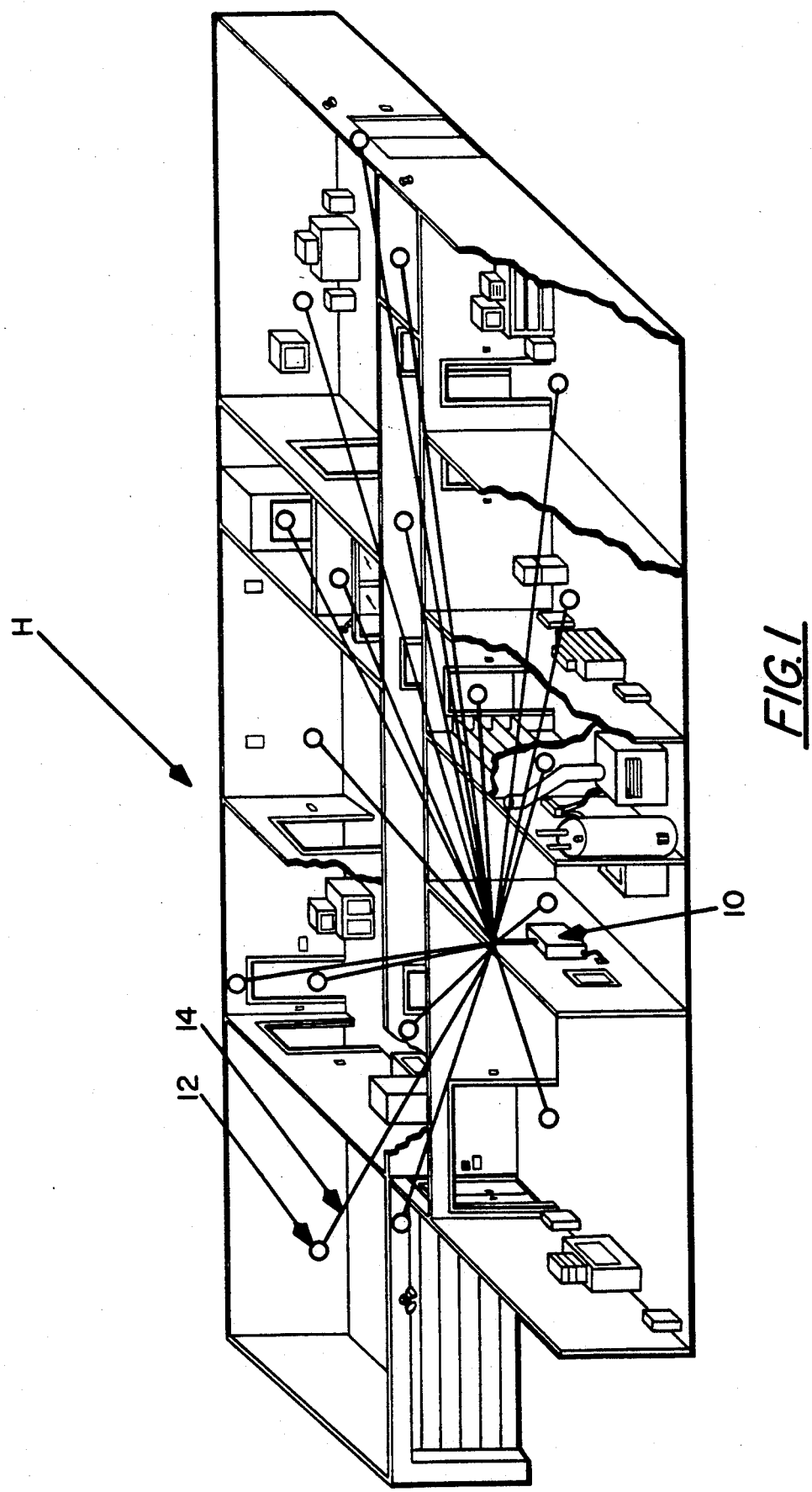
Figure 2:
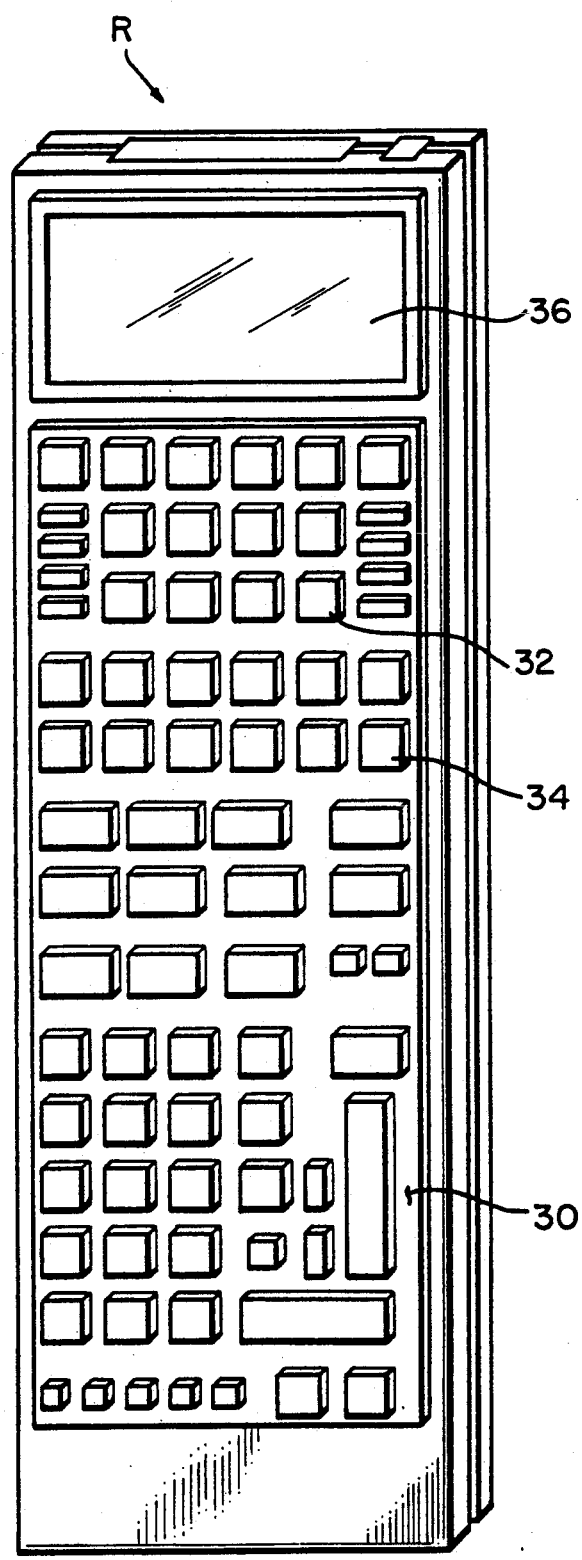
Figure 3:
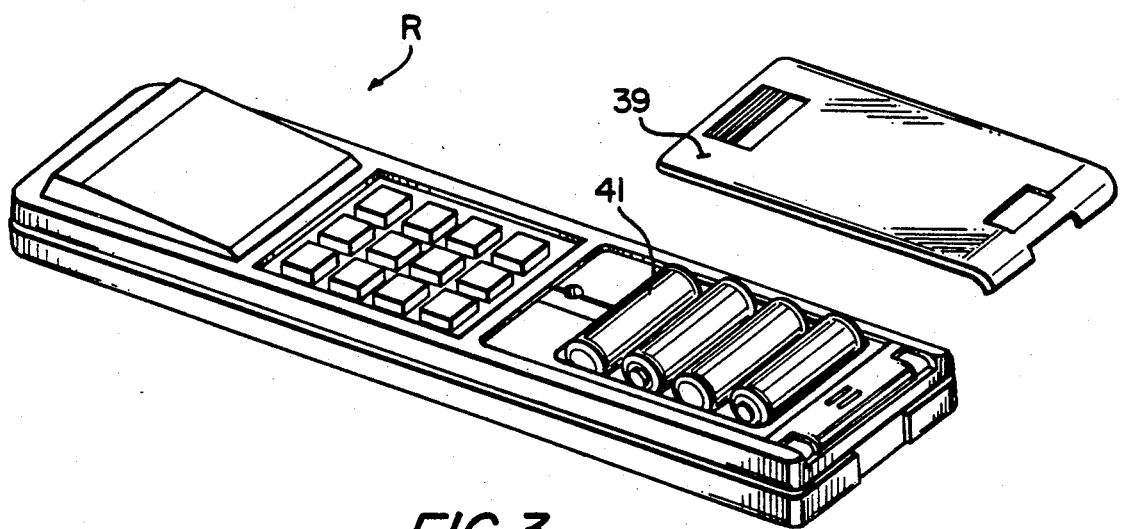
Figure 4:
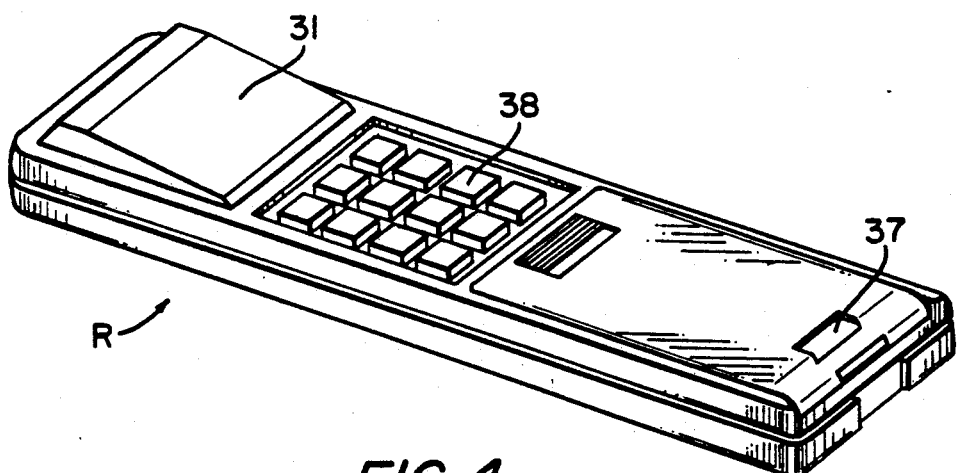
Figure 5:
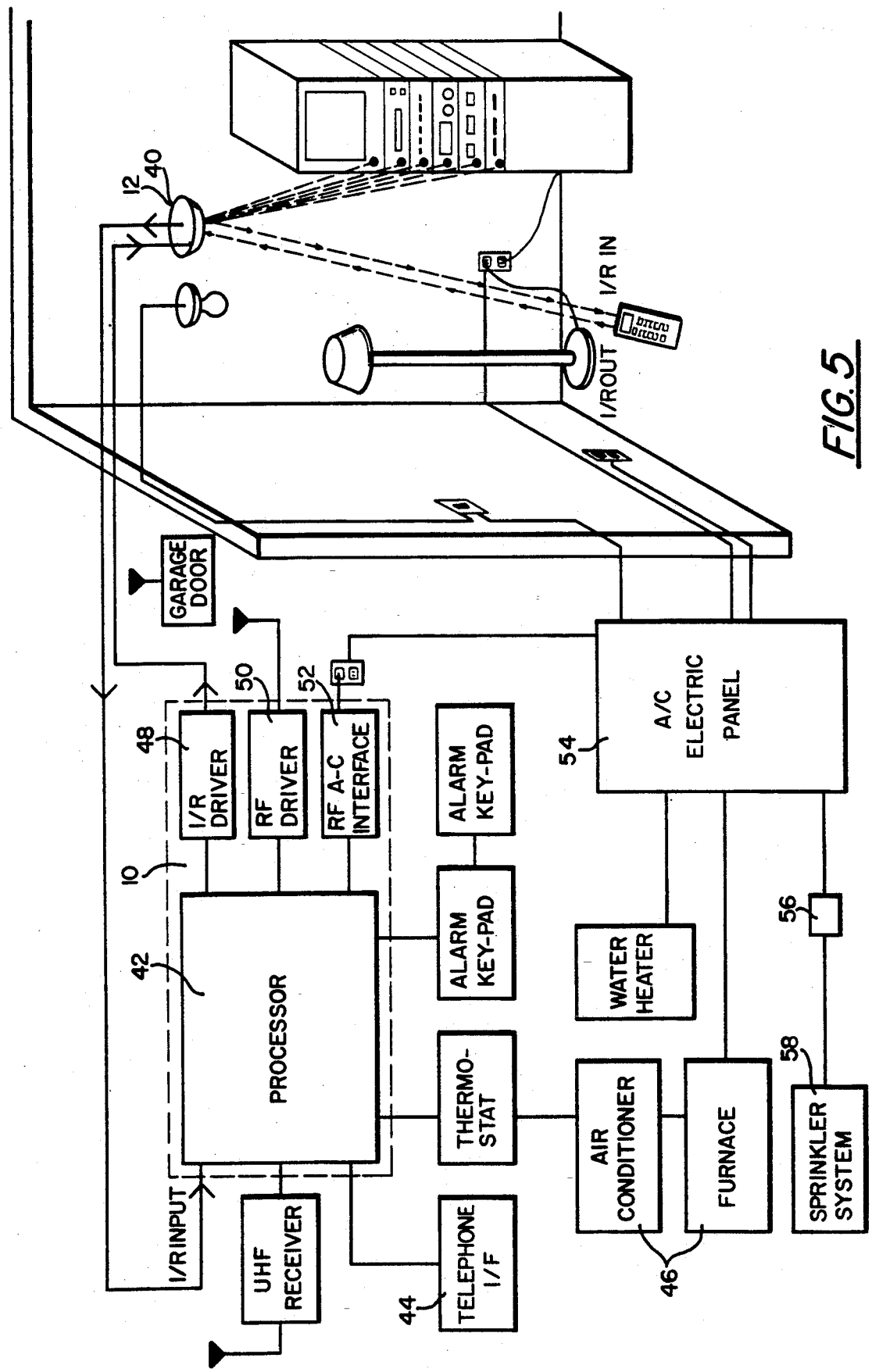
Figure 6:
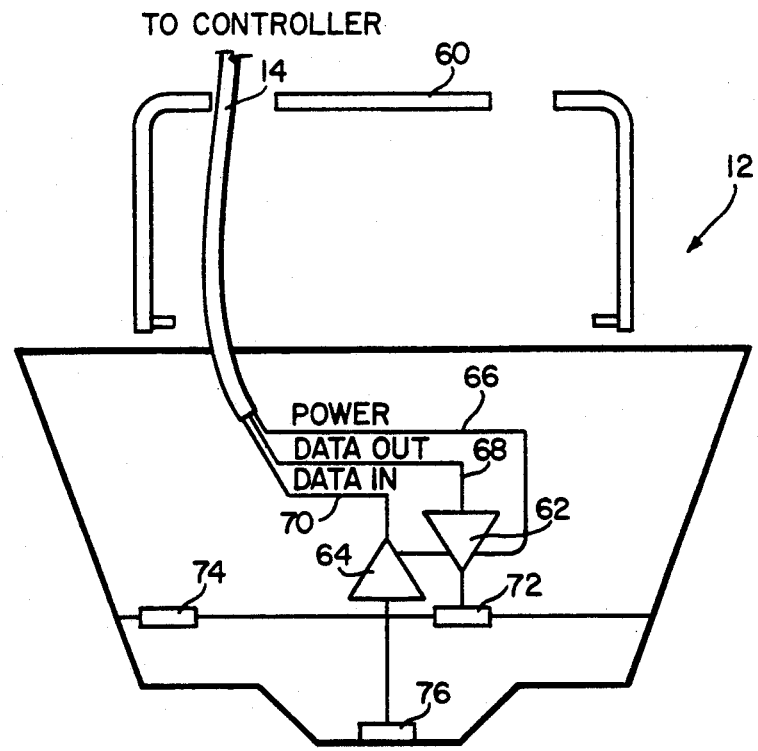
Figure 7:
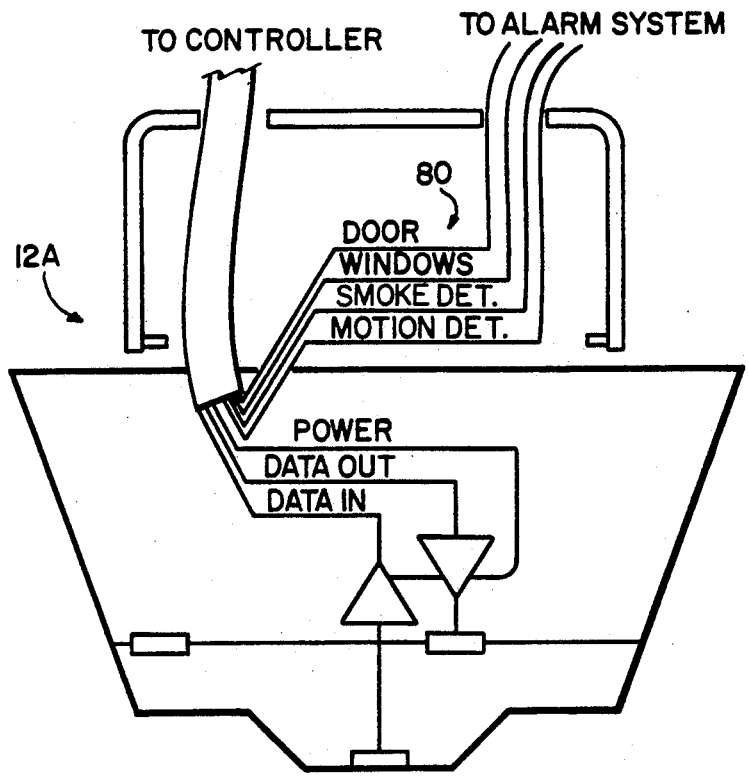

Having thus described the invention in general terms, reference will now be made to the accompanying drawings in which:

FIG. 1 is a schematic perspective view showing a multiroom drawing structure with the remote control system of the present invention;

FIG. 2 is a perspective view of a hand-held remote control unit forming part of the system of the present invention;

FIG. 3 is a perspective view showing a rear side of the hand-held remote control unit of FIG. 2 with a battery compartment cover removed;

FIG. 4 is a perspective view also showing the rear side of the hand-held remote control unit with the battery compartment cover in place;

FIG. 5 is a schematic circuit view, particularly in perspective, showing some of the major components of the central control means forming part of the remote control system of the present invention:

FIG. 6 is a schematic circuit view showing one form of a zone sensor constructed in accordance with and embodying the present invention; and FIG. 7 is another embodiment of a zone sensor also used in accordance with the present invention.

DETAILED DESCRIPTION OF A PREFERRED EMBODIMENT

Referring now in more detail and by reference characters to the drawings which illustrate a preferred embodiment of the present invention, "H" designates a dwelling structure, such as a house having a plurality of rooms. In this case, each of the rooms are separated from one another by a plurality of walls, as illustrated.

A computer 10 forming part of a remote control system of the present invention is mounted against one of the walls in one of the rooms of this dwelling structure H. This computer 10 is connected to a plurality of sensors 12 by means of electrical conductors 14, with a specific sensor 12 located in each room of the dwelling structure. In this case, the electrical conductors can be buried within the walls and ceiling of the dwelling structure. The sensors 12 would be located, typically on the ceiling of each room in the dwelling structure. However, the sensor 12 can be mounted in any suitable and convenient location capable of receiving signals from and transmitting signals to the electrically operable equipment.

The compute which is employed in connection with the remote control system of the present invention may be a relatively small microcomputer, and can be packaged in a relatively small housing for location in an unobtrusive position in the dwelling structure.

The sensors 12 which are used in accordance with the present invention, are preferably infrared sensors. Infrared sensors are preferred because they allow a standardized set of commands to be used in each room or zone and to affect only the sensor in that zone to thereby permit the processor to identify and address that particular room or zone. Thus, the infrared signals can be used to transmit control commands from the hand-held unit to the particular sensor and the sensor can transmit information bearing signals from the el ®ctrically operable equipment to the hand-held remote control unit in that zone.

FIG. 2 illustrates one embodiment of a hand-held remote control unit "R". This remote control unit "R" comprises an outer housing 30 and a plurality of manually actuable function switches 32. The remote control unit also has data input push button switches 34. Furthermore, the remote control unit has a display member 36.

The actual construction of the remote control unit itself is generally conventional and is therefore neither illustrated nor described in any further detail herein. In this respect, a typical remote control unit having manually actuable switches may be used. The remote control unit, of the present invention, however, has pushbutton switches as well as data entry pushbutton switches. Moreover, this remote control unit is capable of generating a menu of potential commands. The user of the remote control hand-held unit will thereupon actuate a plurality of these switches in predetermined combinations, and in accordance with the menu instructions in order to generate particular commands.

The remote control unit 12 may also incorporate a telephone unit on one side as shown in FIGS. 3 and 4. Thus, the housing 30 may have a speaker 31 and a microphone 37 located on the rear side thereof and may also feature a dialer in the form of a conventional "touch-tone" push button pad 38. Whether connected by wireless means such as the infrared sensor, or by current carrying conductors, the input protocol of the computer or processor is the same.

FIG. 3 illustrates a battery compartment cover plate 39 removed from a battery compartment and which contains a plurality of conventional dry cell batteries 41. In this way, the remote control hand-held unit is capable of being operated on battery power. Moreover, these batteries 41 could be of the re-chargable type, if desired.

One of the important aspects of the present invention is that the computer means, such as the microprocessor, and which operates as a central controller, is capable of memorizing a code format for each particular piece of electrically operable equipment. Moreover, because of the vast storage of the computer, there is essentially an unlimited number of types of electrically operable equipment which can be used in the remote control system of the present invention.

The computer means is provided with some type of input means for receiving and storing the code format of each piece of electrically operable equipment. This input means may adopt the form of a computer keyboard input or other type of input means. Moreover, the input means may adopt the form of a telephone coupled modem to receive down-loaded signals transmitted by a manufacturer of the equipment over telephone lines to the computer. In any event, and in this way, the code format of each piece of electrically operable equipment is reused by the computer to generate a format of encoded signals for each type of electrically operable equipment.

The encoded signals which are generated are compatible with and capable of operating the electrically operable equipment. Certain of the pieces of electrically operable equipment will thereby be operated by different encoded signals than other pieces of the electrically operable equipment. In this way, there are essentially an unlimited number of code formats which may be used for forming different command signals for the various pieces of electrically operable equipment.

As indicated previously, the remote control unit R is provided with a specified number of key switches as for example, eighty switches. Some of these switches may be provided only for data entry, and others may be provided only for generation of commands. In either case, while there is a finite number of push button key switches which are available, the apparatus is capable of generating an essentially unlimited number of command formats. In this sense, the term "unlimited" effectively means that it is possible to generate more command formats then the number of pieces of equipment which would reasonably be available in an average dwelling structure which ought to be controlled.

The user of the device initially can program in various controls or command feature which are desired. Furthermore, the user can even effectively program menus which are to be generated in order to obtain a series of commands. As a simple example, the user may first program all lighting systems and then subdivide that between incandescent lighting systems and florescent lighting systems. Further, the incandescent lighting systems can be divided into outdoor and indoor lighted areas. After that, specific lights can be controlled. In essence, a menu of each of the various decisions which are available will be displayed such that the user can acuate the proper number of switches in predetermined combinations to selectively input the desired command or commands.

The remote control keys on the remote control unit can be operated in combination in order to provide an input protocol for a particular subject, or a zone selection or the like. In this case, again, the user of the system can program the specific zones or areas which are to be controlled.

It should also be understood that while the devices may usually employ both an input/output protocol, they can be used for command-only purposes. Thus, it is not necessary in all cases to provide feedback information from electrically operable equipment to the remote control unit.

FIG. 5 more fully illustrates some of the major components forming part of the central controller in the remote control system of the present invention. FIG. 5 illustrates the major components of this controller connected to a suitable infrared sensor or similar sensor which may be employed with the present invention.

An individual infrared receiver 40 operates in conjunction with each sensor 12. The central controller in the form of the computer 10 receives signals from the infrared receiver 40, or otherwise another receiver which is compatible with the particular sensor. The infrared receiver 40 effectively receives the data through the sensor 12 from the remote controlled handheld remote unit. In this case, data is transferred from the infrared receiver 40 to a microprocessor 42 forming part of the central control unit. This microprocessor 42 may be connected to separate individual systems, such as a telephone system 44, a home air environment system 46, including furnace, air conditioning and the like, as well as other individual control systems.

The microprocessor is further connected to a programable transmitter 48. In the preferred embodiment of the present invention, this transmitter 48 would be an infrared transmitter. In like manner, the microprocessor 42 is connected to a programable UHF transmitter. The provision of the UHF transmitter may desirable in the control unit 10, inasmuch as certain home appliances may have the capability of operating with RF transmission and not infrared transmission.

The central controller 10 further includes a programable AC line interface unit 52. This unit is desirable for connection to line appliances which may not necessarily have infrared data receiving capability or otherwise RF data receiving capability.

The control unit 52 may be connected to the circuit breaker 54, or otherwise it may be connected to a suitable circuit breaker of the home environment. In addition, the central unit 10 may control an off-on module 56, as also shown in FIG. 5.

As a simple example of a suitable system which may be connected through the off-on module 56 to the programable line interface 52 is a sprinkler system 58. In like manner, a heating unit is connected directly to the circuit breaker 54 and to the programable line interface unit 52.

The programable line interface 52 may be connected to switches in the home environment, such as a programable light switch, as illustrated in FIG. 5. The remote control unit could control other appliances in the home environment, as aforesaid.

Some of the types of electrically operatble equipment which have some intelligence capabilities and which can be used in the system of the present invention include a home entertainment system offered under the mark "Simul.Source" by Soundstream System. Heating and cooling equipment of the type offered by Hometronics, Inc. of Indianapolis, Ind. contain some intelligence member which is capable of being operated through sensed signals. There are numerous security systems which can be interfaced with the remote control system of the present invention and include for example, the X-10 Powerhouse security system offered by U.S.A. Inc. of Northwale, N.J.

FIGS. 6 and 7 illustrate particular infrared sensors which may be used in accordance in the present invention. One such sensor 12, as illustrated in FIG. 6, includes a receptacle box 60 receiving a conductor 14. This conductor 14 is typically a multi-conductor cable in the manner as shown. The sensor includes a pair of amplifiers 62 and 64 which are also connected in the manner as illustrated in FIG. 6. The amplifiers 62 and 64 each receive a power signal through a power conductor 66. The amplifier 62 receives a data output signal over a conductor 68 and the amplifier 64 returns a data input signal over a conductor 70. The amplifier 62 has its output connected to an infrared transmitting lamp 72 as well as another infrared transmitting lamp 74. An infrared receiving eye 76 is connected directly to the input of the amplifier 64 in the manner as shown.

FIG. 7 illustrates a slightly modified form of sensor 12A. In this case, the sensor 12A is substantially similar to the previously described sensor 12, as illustrated in FIG. 6, except that it has a plurality of additional conductors capable of being connected to an alarm system. Thus, for example, the conductor cable 14 would contain a plurality of additional conductors 80 for connection to doors, windows, smoke detectors and the like forming part of the alarm system of the dwelling structure.

Thus, there has been illustrated and described a unique and novel remote control system for operating electrically operable equipment in a person occupyable structure with essentially an unlimited command format and which thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and application which do not depart from the spirit and scope of the invention are deemed to be covered by the invention.

Having thus described the invention, what I desire to claim and secure by letters patent is:

1. A remote control system capable of operating electrically operable equipment in a person occupiable structure with essentially unlimited command format, said system comprising:

(a) a signal receiving sensor in certain rooms of said person occupiable structure, (b) a central computer means associated with said system and capable of receiving a signal from ech of said sensors, (c) a person operable portable remote control transmitter and receiver unit and which is remote from said sensor for non-electrically conductive transmission of an equipment operable signal to the sensor in he room in which said transmitter is situated and for receiving information signals from the sensor in that room, said transmitter and receiver unit having a plurality of manually actuable switch means to generate an equipment operable signal, (d) conductor means connecting each of said sensors to said computer means for transmitting over said conductor means each of said signals from said transmitter and recei-er units to said computer means and for transmitting over said conductor means information signals from said computer means to said transmitter and receiver units, (e) said computer means having control means to memorize the code format of each of the pieces of electrically operable equipment to be operated by daid system and where certain of the pieces of equipment have different command operated formats than other of the pieces of equipment, said computer means thereby generating a format of encoded signals for each type of electrically operable equipment and which encoded signals are compatible with and capable of operating that piece of electrically operable equipment, such that certain of the pieces of electrically operable equipment may be operated by different encoded signals than other pieces of the electrically operable equipment, whereby there is an essentially unlimited number of code formats which may be formed into encoded signals by the computer means for operation of different pieces of electrically operable equipment and there is an essentially unlimited number of types of electrically operable equipment which can be operated with the remote control system, and (f) input means operatively connected to the computer means operable by the user to introduce various control features and command features.

2. The remote control system of claim 1 further characterized in that the structure has a plurality of rooms or zones and that electrically operable equipment in certain of the rooms are operable by a remote control unit in another room.

3. The remote control system of claim 1 further characterized in that the remote control unit has a display member for displaying information received from each of the pieces of electrically operable equipment.

4. The remote control system of claim 1 further characterized in that the person occupiable structure is a dwelling structure.

5. The remote control system of claim 4 further characterized in that the electrically operable equipment is comprised of different type of entertainment equipment and work function equipment.

6. The remote control system of claim 1 further characterized in that the sensors are infrared sensors and that the signals generated are infrared signals.

7. A method of controlling electrically operable equipment in a person occupiable structure with essentially unlimited command format, said method comprising:

(a) generating command signals from a hand-held remote control unit in a room of a person occupiable structure and which signals are capable of controlling electrically operable equipment in the person occupiable structure and, (b) transmitting the generated command signals by non-electrically conductive transmission to sensors which are remote from the hand-held remote control unit, (c) sensing the transmitted signals generated by the hand-held remote control unit, (d) transmitting the sensed signals to a central processor for generating a command signal in a format capable of being accessed by the particular electrically operable equipment which is to be controlled, (e) inputting the code format of each of the pieces of electrically operable equipment to be operated into the central processor and where certain of the pieces of equipment have different command operated formats than others of the pieces of equipment, and (f) generating a format of encoded signals in the central processor for each type of electrically operable equipment and which encoded signals are compatible with and capable of operating each specified piece of electrically operable equipment, such that certain of the pieces of electrically operable equipment may be operated by different encoded signals than others of the pieces of electrically operable equipment, whereby the method may utilize an essentially unlimited number of code formats which may be formed into encoded signals for operation of the different pieces of electrically operable equipment and where the method may utilize an essentially unlimited number of types of electrically operable equipment.

8. The method of claim 7 further characterized in that said method comprises actuating a plurality of manually actuable switches in pre-determined combinations on said remote control unit to generate command signals.

9. The method of claim 7 further characterized in that method comprises causing the generation of information bearing signals by the pieces of electrically operable equipment and which are transmitted via the central processor to the hand-held remote control unit.

10. The method of claim 9 further characterized in that the information signals from the pieces of equipment are generated on a display on the hand-held remote control unit.

11. The method of claim 7 further characterized in that the signals generated by the remote control unit are infrared signals, and are not programmable and contain a specific set of original commands which form a language protocol.

* * * * *

UNITED STATES PATENT AND TRADEMARK OFFICE
CERTIFICATE OF CORRECTION

PATENT NO. : 5,109,222
DATED : April 28, 1992
INVENTOR(S) : Welty

It is certified that error appears in the above—identified patent and that said Letters Patent is hereby corrected as shown below:

On the Title page, item [56], delete "Schaar" and insert therefore:

---Schaap ---

Column 1, line 18, delete "Briief" and insert therefor:
--- Brief ---;
Column 3, line 42-43, delete "carring" and insert therefor:
--- carrying ---;
Column 4, line 53, delete "th" and insert therfor:
--- the ---;
Column 5, line 36, delete "compute" and insert therefor:
--- computer ---;
Column 5, line 50, delete "electrically" and insert therefor:
--- electrically ---;
Column 7, line 50, delete "applicances" and insert therefor:
--- appliances ---;

UNITED STATES PATENT AND TRADEMARK OFFICE
CERTIFICATE OF CORRECTION

PATENT NO.  : 5,109,222
DATED       : April 28, 1992
INVENTOR(S) : Welty

It is certified that error appears in the above—identified patent and that said Letters Patent is hereby corrected as shown below:

<u>Claim 1:</u>

Column 9, line 2, delete "ech" and insert therefor:

--- each ---;

Column 9, line 17, delete " recei er" and insert therefor:

--- receiver ---;

Column 9, line, 24, delete "daid" and insert therefor:

--- said ---;

Signed and Sealed this

Twenty-first Day of September, 1993

Attest:

BRUCE LEHMAN

*Attesting Officer*        *Commissioner of Patents and Trademarks*